(12) United States Patent
Montaldo et al.

(10) Patent No.: US 11,586,184 B2
(45) Date of Patent: Feb. 21, 2023

(54) METHOD AND SYSTEM FOR AUTOMATIC MANAGEMENT OF A BUFFER SYSTEM

(71) Applicant: SIEMENS AKTIENGESELLSCHAFT, Munich (DE)

(72) Inventors: Ernesto Montaldo, Genoa (IT); Jens Schnittger, Lonnerstadt (DE); Giovanni Venturi, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 353 days.

(21) Appl. No.: 16/819,570

(22) Filed: Mar. 16, 2020

(65) Prior Publication Data
US 2020/0293029 A1   Sep. 17, 2020

(30) Foreign Application Priority Data
Mar. 15, 2019   (EP) .................................... 19163062

(51) Int. Cl.
| | |
|---|---|
| *G05B 19/418* | (2006.01) |
| *G06Q 10/06* | (2012.01) |
| *G06Q 10/08* | (2012.01) |
| *G06Q 50/04* | (2012.01) |
| *G06Q 10/0631* | (2023.01) |
| *G06Q 10/087* | (2023.01) |

(52) U.S. Cl.
CPC . *G05B 19/41865* (2013.01); *G05B 19/41885* (2013.01); *G06Q 10/06315* (2013.01); *G06Q 10/087* (2013.01); *G06Q 50/04* (2013.01)

(58) Field of Classification Search
None
See application file for complete search history.

(56) References Cited

U.S. PATENT DOCUMENTS

| | | | |
|---|---|---|---|
| 6,345,259 B1* | 2/2002 | Sandoval | G06Q 20/20 700/109 |
| 7,483,761 B2 | 1/2009 | Wang et al. | |
| 8,825,534 B2 | 9/2014 | Yuen et al. | |
| 2004/0002788 A1* | 1/2004 | Morimoto | G05B 19/41805 700/214 |
| 2006/0129462 A1* | 6/2006 | Pankl | G06Q 30/0613 705/26.81 |

(Continued)

*Primary Examiner* — Charles E Anya
(74) *Attorney, Agent, or Firm* — Laurence A. Greenberg; Werner H. Stemer; Ralph E. Locher

(57) ABSTRACT

A system and a method for managing a buffer system contain compartments for stocking contents needed for a production of products. The method includes: a) a determination from an initial configuration of the buffer system and a stack of orders of a production cycle and a configuration of the buffer system enabling an execution of the production cycle. The determination is completed by carrying out a virtual filling of the compartments with content required by the orders; b) providing instructions controlling content filling/emptying actions to a transport system for filling and/or emptying compartments; c) triggering an execution of the production cycle by the production equipment while recording usage of buffer system content; and d) updating the stack of orders after the end of the execution of the production cycle by removing from the stack of orders all orders which have been fully executed during the execution of the production cycle.

15 Claims, 3 Drawing Sheets

(56) References Cited

U.S. PATENT DOCUMENTS

| | | | | |
|---|---|---|---|---|
| 2007/0204086 A1* | 8/2007 | Jaroszewski | ......... | H05K 13/085 |
| | | | | 713/168 |
| 2014/0040075 A1* | 2/2014 | Perry | ................. | G06Q 30/0635 |
| | | | | 705/26.81 |
| 2016/0179081 A1* | 6/2016 | Sun | .................... | G05B 19/4069 |
| | | | | 700/97 |
| 2017/0270238 A1* | 9/2017 | Borovinskih | .......... | G06Q 50/04 |
| 2017/0330138 A1* | 11/2017 | Stoeckel | .......... | G06Q 10/06315 |
| 2019/0303815 A1* | 10/2019 | Li | .......................... | G06Q 50/04 |

* cited by examiner

METHOD AND SYSTEM FOR AUTOMATIC MANAGEMENT OF A BUFFER SYSTEM

CROSS-REFERENCE TO RELATED APPLICATION

This application claims the priority, under 35 U.S.C. § 119, of German application EP19163062, filed Mar. 15, 2019; the prior application is herewith incorporated by reference in its entirety.

BACKGROUND OF THE INVENTION

Field of the Invention

The invention relates to a method and a system for automatically managing a buffer system. In particular, the present invention proposes an MES driven buffer system, MES standing for Manufacturing Execution System.

The present invention is related to the concept of smart buffer (also called smart magazine) which has become popular in recent years and has played a role for the realization of the "Internet of Things" particularly in the context of consumer goods. A smart buffer is defined as a recipient of goods having a set of sensors, an internal processor, and a web interface providing information about its contents. The ultimate goal is that a smart buffer should manage replenishing operations in an automatic way. The first implementations of smart buffers were simple appliances like hotel-room mini-bars and snack dispensers; more recently, the concept has been extended to more complex objects like a retailer warehouse.

The present invention proposes an application of the smart buffer concept to the field of manufacturing, especially in an Industry 4.0 setting with a high variability of products (and therefore materials to be stored in the buffers) and production volumes. As explained later on, the smart buffer according to the present invention provides an added value for manufacturing operations compared to existing techniques notably by reducing supervision and control by human operators. Current smart buffer solutions rely on a kind of ad hoc management of the buffer, reacting only on whether a current content falls below a certain configured threshold or on a rigid, manually defined, pre-planning of buffer usage for an entire production cycle. Such solutions are not suitable for an Industry 4.0 production type, wherein extreme flexibility is required regarding the contents and volume of production orders.

BRIEF SUMMARY OF THE INVENTION

An objective of the present invention is therefore to provide a method and a system for an efficient and automatic management of a smart buffer within the field of manufacturing, in particular in the context of Industry 4.0.

This objective is achieved according to the present invention by a method for managing a buffer system and a smart buffer management system for managing a buffer system according to the object of the independent claims. Dependent claims present further advantages of the invention.

The present invention proposes in particular a method for managing a buffer system (also called hereafter smart buffer), wherein the buffer system contains in particular a structured temporary storage area with compartments for storing different types of contents, the contents being preferentially materials and/or tools. A material is any matter that can be shaped or manipulated and which is consumed during manufacturing operations, and a tool is a device/machine that is not consumed during manufacturing operations but used by production equipment for a manufacturing operation, the buffer system being further preferentially configured for storing a single type of material per compartment and a single tool per compartment. In particular, one or several compartments of the buffer system may contain the same material or tool, but each compartment may only comprise one tool or a single type of material. Preferentially, all compartments and/or all buffers of the buffer system are identical.

The buffer system according to the invention is managed by a smart buffer management system (hereafter "SBMS") which can host, contain, cooperate with an MES or be controlled by the latter. The SBMS is configured for managing the content of each compartment. In particular, the SBMS is configured for creating a digital twin (i.e. a digital representation of the (real) buffer system) of the buffer system and using the digital twin to carry out a virtual filling of the compartments of the buffer system with content required by received orders and then drive physical movements of contents from/to the (real) buffer system on the basis of a configuration of the buffer system obtained from the virtual filling. The buffer system according to the invention may further contain one or several sensors connected to the SBMS, the latter further containing one or several processors, and a communication network for exchanging information between sensors, processors and, if needed, the MES system, or with any transport system for filling compartments with content and/or removing content from compartments of the buffer system.

In particular, the method according to the invention is configured for managing a buffer system of a manufacturer and/or of a production equipment of the manufacturer, wherein the buffer system contains as previously explained compartments, for instance tool compartments and material compartments, for stocking contents, e.g. materials in material compartments and/or a tool in a tool compartment, needed for a production of one or several products by production equipment during an execution of a production cycle. The production cycle is defined by a set of orders whose execution by the production equipment results in the production of the one or several products, wherein each order defines the production requirement(s) of one, and preferentially only one, product to be produced by the production equipment, wherein a configuration of the buffer system relates to the content contained or that shall be contained within the buffer system, the method containing:

a determination, by means of the SBMS, from an initial configuration $C'\_i+1$ of the buffer system and a stack of orders, of a production cycle $P\_i+1$ and a configuration $C\_i+1$ of the buffer system enabling an execution of the production cycle $P\_i+1$ while preferentially minimizing the costs for achieving the configuration $C\_i+1$ from the initial configuration $C'\_i+1$, wherein the determination is obtained by the SBMS by carrying out a virtual filling of the compartments of the buffer system with content required by orders of the stack of orders, wherein the determination contains for instance:

a) first step, wherein the buffer system is considered as empty for determining the production cycle $P\_i+1$ even if the buffer system contains a content according to the initial configuration $C'\_i+1$, wherein the SBMS iteratively allocates capacities of the compartments of the buffer system to content required by the orders of the stack of orders by processing the orders from the highest priority order to the lowest priority order until a capacity limit (also called "predefined capacity") of the buffer system or of a compartment is reached, but without yet assigning the compartment itself for the content for which capacity has been allocated (in this first step, the SBMS proceeds to a virtual filling of the compartments of the buffer system free of any assignment of the capacity of any real compartment to a treated order. Typically, a digital representation of the buffer system, e.g. its digital twin, is used by the SBMS for virtually filling the compartments). In other words, the SBMS performs a capacity check of the buffer system by allotting or allocating compartment or buffer system capacity for a content required by an order, without assigning a specific compartment for the content for which capacity allocation has been made. The assignment of a compartment for the content for which some capacity has been allocated takes place in a second step, as described below), wherein all orders completely satisfied by capacity allocation form a set of orders called "truncated stack of orders", wherein the last order of the stack of orders which has been completely satisfied by allocating compartment capacity of the buffer system is called the $n\_i+1\_LS$ order ("LS" standing for "Last Satisfied"), the SBMS including then all orders of the truncated stack of orders and only the latter in the production cycle $P\_i+1$;

b) a second step, wherein the SBMS automatically determines, from the initial configuration $C'\_i+1$ of the buffer system, the configuration $C\_i+1$ which minimizes (costly) content (re)filling/emptying actions with respect to content requirement defined by the production cycle $P\_i+1$, and wherein compartments of the buffer system are assigned for content by the SBMS. In particular, if the buffer system was completely empty in the initial configuration, then the assignment of the compartment takes place simultaneously with the allocation of its capacity. Otherwise, if the buffer system was not completely empty in the initial configuration, then, before assigning a compartment, the SBMS determines which configuration $C\_i+1$ will minimize the costs resulting from (re)filling/emptying actions which have to be carried out for filling compartments with the required content and/or emptying compartments from a content by taking account of the current content of the buffer system in the initial configuration;

b) providing instructions, notably automatically, controlling content (re)filling/emptying actions to a transport system and/or an operator for (re)filling and/or emptying compartments of the buffer system in order to achieve the configuration $C\_i+1$ for the buffer system;

c) triggering, notably automatically, an execution of the production cycle $P\_i+1$ by the production equipment while recording usage of buffer system content;

d) updating the stack of orders after the end of the execution of the production cycle $P\_i+1$ by removing from the latter all orders which have been fully executed during the execution of the production cycle $P\_i+1$ and, if needed, automatically starting a new production cycle by repeating steps a-d, using, as initial configuration of the buffer system, its configuration at the end of the execution of the production cycle $P\_i+1$ and the updated stack of orders. The initial configuration might be the configuration of the buffer system before any production cycle has taken place, or might be the configuration of the buffer system at the end of a production cycle. Preferentially, before starting a production cycle, previous reservations/assignments are canceled.

The present invention concerns also a smart buffer management system, containing a processing unit, a memory for recording content of a buffer system and received production orders, a connection to a network enabling the smart buffer management system to communicate with a transport system configured for filling and/or emptying compartments of the buffer system, with production equipment, with a production management system, and/or optionally with an MES if needed. The smart buffer management system is configured for implementing the method described in the present document and enabling an efficient management of the buffer system.

A buffer system containing a SBMS as described in the present document is also part of the invention.

Other features which are considered as characteristic for the invention are set forth in the appended claims.

Although the invention is illustrated and described herein as embodied in a method and a system for automatic management of a buffer system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
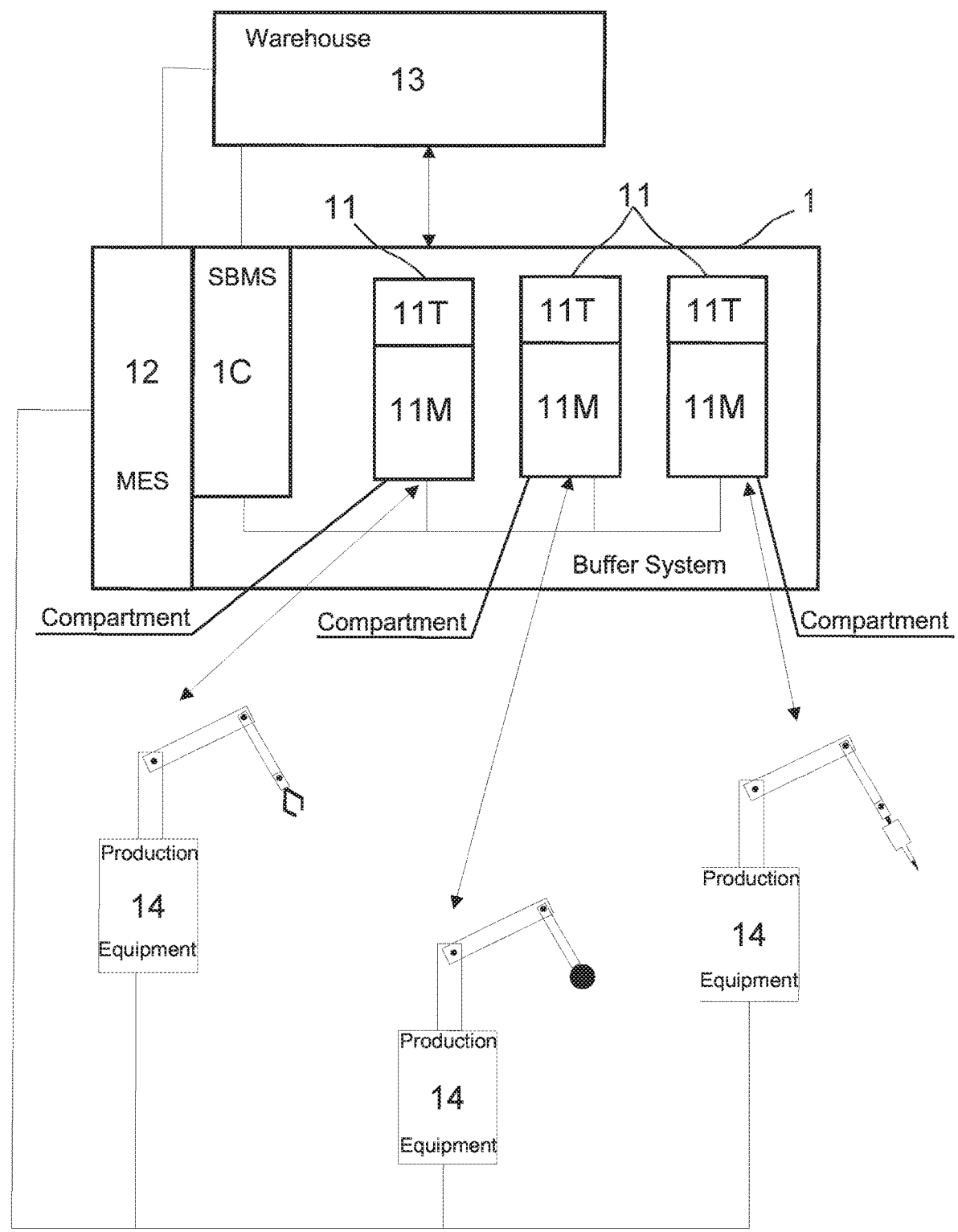
FIG. 1 is an illustration of an example of a smart buffer management system according to the invention.

The present invention lies in particular in the technical field of manufacturing execution systems used in manufacturing industry for gathering and providing information that helps the manufacturing of products. Referring now to the figures of the drawings in detail and first, particularly to FIG. 1 thereof, there is shown a set of production equipment 14 (e.g. machines, manual workplaces, etc.) for producing one or several products, wherein material and tool(s) for producing the product by means of the production equipment is provided by a buffer system 1, which may contain one or several buffers 11.

The buffer system 1 contains compartments, notably material compartments 11M and tool compartments 11T. In particular, the buffer system 1 may contain for each set of production equipment 14 at least one near-by buffer 11 containing at least one material compartment 11M and/or at least one tool compartment 11T located near-by the production equipment 14 and configured for providing material and/or tool(s) to the production equipment 14. According to the present invention, the buffer system 1 is a physical real system which is characterized by a finite capacity for stocking material and tools. Each tool compartment 11T is preferentially configured for containing only one tool at a time (i.e. it cannot comprise two tools, same or different, at any time), and each material compartment 11M may comprise in particular only one kind or type of material (i.e. a material compartment contains only identical material) at a time (in other words it cannot comprise two different materials at any time), wherein the amount of material which might be stocked in a material compartment depends on the size or volume of the material compartment, i.e. its capacity for stocking the material. Transport systems, e.g. automatic machines, are configured for transporting the material and/or tool between the compartments 11M, 11T and a warehouse 13, picking up for instance some material or a tool from a compartment of the buffer system or from the warehouse 13, and bringing the material or tool back to the warehouse 13 or to a material or tool compartment of the buffer system 1. The management of the content of the buffer system 1 is provided by a SBMS 1C, which might be part of the buffer system, and which is configured for planning (re)filling/emptying actions of the compartments of the buffer system with content coming for instance from the warehouse 13 and for providing instructions for the (re)filling/emptying actions so that a specific configuration of the buffer system 1 is reached before starting any new production cycle with the production equipment 14.

The method and SBMS 1C according to the invention enable to (re)fill/exchange/empty material and/or tools within/between/from buffer compartments 11T, 11M at a proper time and with an optimized quantity of material or type of tool by considering upcoming orders for producing the product by means of the production equipment. Advantageously, the present method and SBMS enable to minimize the physical actions (such as (re)filling material, exchanging tools or material, removing tool or material, adding tools or material) that must be carried out for satisfying production orders for producing the one or several products by means of the production equipment, reducing therefore the production costs.

Production according to the present invention is assumed to happen in cycles, wherein a certain number of orders is processed during each cycle. The certain number of orders is automatically determined by the SBMS from an availability of materials and tools in compartments of the buffer system 1. The production typically has to be interrupted for re-fills/re-configurations of the buffer system when one or several of its compartments run out of material or when another tool is required for manufacturing a product. A material compartment of the buffer system is preferably refilled in function of current and future material usage by the production equipment when executing production orders. In particular, the buffer system contains n material compartments, which might be distributed among one or several material buffers, wherein preferentially the material buffers are all identical, the n compartments holding at most n different types of material, with n generally smaller than the number of material types that may be needed for production and therefore not in general sufficient to cover all material types that may occur in a given order stack. Preferentially, any material compartment of the buffer system can be used for any material type that can be processed at a production equipment, but in one material compartment there will always be only one type of material at any given time. This advantageously prevents problems in picking the right material since the compartment contains only identical material. The buffer system, in particular each tool buffer of the buffer system, can only hold at any time a limited number of tools defined by the number of tool compartments it comprises. The limited number usually does not suffice to cover all possible production orders. In particular, a given machine is assumed to use only one tool at a time, and so all tools within a tool buffer are different from each other. Preferentially, each tool compartment can hold or contains exactly one tool, and the buffer system may contain in total m tool compartments, which can be distributed among one or several tool buffers.

According to the present invention, and in order to avoid expensive transport and material handling equipment, as well as to avoid access collisions to a buffer (e.g. that may occur when material has to be extracted and refilled at a same time), the buffer system 1 is free of any automated process that would enable a refill of material or exchange of tool during a production process: refilling or exchanging actions take place only between production cycles (i.e. at the end of a production cycle, the buffer system is refilled and reconfigured for the next production cycle), or before starting the very first production cycle, and not continuously according to a current need of a production equipment in order to enable a continuous production process. For instance, the present invention does not contain any automated transport and refilling/tool exchanging devices that would allow for continuous refilling of the material compartments and continuous tool exchanges.

The method according to the invention will be now described in more detail with reference to FIG. 2. According to the present invention, the SBMS 1C of the buffer system 1 may use an MES 12 for gathering information about the production equipment 14 of the manufacturing system, and for planning and controlling the filling, refilling, or removal of contents, i.e. tool or material, within or from the compartments of the buffer system 1 in order to find the optimal configuration of the buffer system 1 that enables production operations by the production equipment 14 during each production cycle at a lower cost and in an efficient manner, while remaining robust against unknown future inflow of new production orders. The production of a product usually decomposes into different steps that use different production equipment. In particular, each production order received by the SBMS is an order that has been broken down, for instance by an MES or a production management system, into the different steps of the production and that makes available to the SBMS information regarding materials and/or tool that are needed for each step of the production and by each production equipment involved in the production. Typically, the MES may provide the following data to the SBMS 1C for each production step via the production order: material amount per material type needed at a given production equipment and/or tool needed for the production step in question at the given production equipment. Alternatively, the SBMS might be configured for receiving a production order for a product and breaking down the production order into the different production steps required for producing the product, and determining for each of the steps the material (amount and type) and/or tool required by each production equipment for producing the product.

In particular, the method according to the invention takes into account the following costs related to buffer management:

a) filling costs and emptying costs: these are the costs for filling a compartment and for emptying a compartment. They are part of the handling costs. The filling costs are assumed to depend only on the type and amount of material to be filled into compartments and may include a material volume independent term for accessing a compartment. Similarly, the emptying costs are calculated by the SBMS in function of the type of material that has to be removed from a compartment and its amount i.e. the quantity of material to be removed, and may also include a material volume independent term for accessing the compartment. Emptying costs arise both in the context of using material stored in buffer compartments for production and in the case where compartments have to be emptied to vacate space needed for another material.

b) retrieving costs: these are the costs for retrieving a material at a warehouse 13 for its transport to a compartment of the buffer system. They are also called picking costs and are part of handling costs;

c) material removal costs: they are the costs for putting unused material of a compartment of the buffer system back into the warehouse 13. They are also part of handling costs;

d) tool exchange cost: this cost is associated with a removal or an insertion of a tool in a buffer compartment. A tool replacement in a compartment is generally unavoidable, because tools are not consumed during equipment operations and at a certain point in time there will be an order that requires a new tool that is not present in the buffer system. To place such a new tool in a compartment, one may have to remove another tool from the compartment in order to release storage space. According to the present invention, the cost penalty for a tool exchange action is treated the same way as the additional cost, i.e. the cost penalty for emptying material from a compartment, i.e. it is a function of the priority of the first order that was requiring the tool that is going to be removed from the compartment;

e) transport costs: they are the costs for transporting a material or a tool from a warehouse to a compartment of the buffer system or conversely from a compartment back to the warehouse. For the present invention, the latter costs play only a minor role since they are assumed to be little dependent on the amount of material transported. Preferentially, the transport costs depend mainly on the number of required transports and not on the amount of transported material. In particular, different materials can come from different warehouses, but a single transport is assumed to be always able to combine all materials from the same warehouse. Note also that the transport costs for transporting material from a compartment of the buffer to the machine using the material are not considered, because they are assumed to be approximately independent of the precise usage of buffer compartments.

Preferentially, the SBMS is configured for associating a cost to each action that will have to be carried out for (re)configuring the buffer system and for determining the (re)configuration (i.e. the subsequent configuration) which minimizes a total cost representing the sum of the different costs for each action required for (re)configuring the buffer system. According to the present invention, the SBMS automatically determines the reconfiguration of the buffer system which minimizes a total cost being the sum of the costs for material and/or tool transportation, tool exchange action and material compartment filling/emptying and automatically implements the (re)configuration with the lowest cost, and triggers then the execution of a next production cycle.

Figure 2:
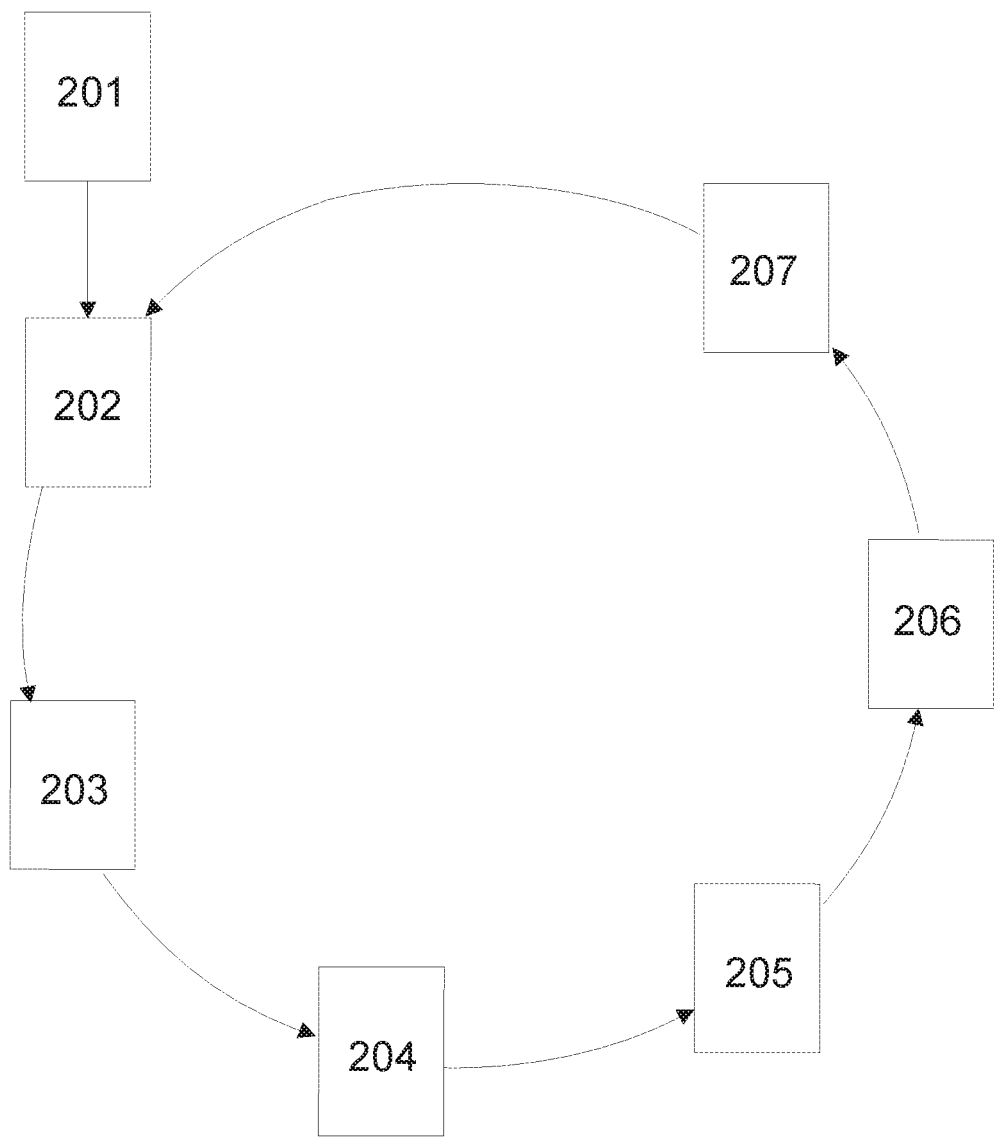
FIG. 2 is a flowchart showing a method for managing a buffer system according to the invention.

FIG. 2 schematically shows a series of steps 201-207 enabling the efficient management of the buffer system 1 with respect to production requirements received through production orders.

At step 201, the SBMS receives, in particular automatically, production orders, for instance from a production management system/MES. The production order, also simply called "order" in the present text, provides the SBMS with all necessary information regarding the materials and/or tool(s) required for the production of a product, i.e. which type and/or amount of material, and/or which tool, is required for which production equipment and for which step of the production. Preferably, the SBMS further receives, for instance from the production management system or the MES, information on the relative priority of each order compared to the others. The information might be provided by a list wherein the orders are classified according to their priority, from the highest priority to the lowest priority. The SBMS preferably obeys the principle that material and tool requirements for higher priority orders are satisfied before the requirements for lower priority orders. Optionally, the information on the relative priority of each order compared to the others is not received by the SBMS, but determined by the latter. For instance, the determination of the relative priority of each order compared to the others might be based on a classification of the orders according to the time at which each order was received by the SBMS and/or according to an indication of a priority level stored within all or some orders. Preferentially, the SBMS automatically determines whether an order has a higher priority compared to another order by applying the two following criteria:

1. an order containing an indication of a higher priority compared to another order has to be processed before the another order which contains an indication of a lower priority, and 2. when two orders characterized by a same priority are received, then the order received first has to be processed before the subsequently received order ("first come first served" principle).

In particular, the SBMS continuously receives orders which can then be memorized in a memory of the SBMS. Alternatively, or additionally, the SBMS may receive the list ranking the orders from the MES or the production management system before starting each production cycle and/or each time the order of the ranked orders of the previously sent list has been changed, for instance due to a new incoming order whose priority has to be taken into account by the SBMS. The received orders, for instance the orders of the list, form a stack of orders. Preferentially, the stack of orders is a "local" stack of orders, i.e. it is determined by the MES per production equipment, for instance for each production equipment, defining therefore the material and/or tool that will be required by a production equipment for enabling a production step for the production of the product. The "local" orders of a local stack of orders corresponding to a product are in fact just the elements of the complete production order which are to be carried out by certain production equipment with a certain associated buffer. According to the present invention and in particular, the production cycle might be the production cycle of the production equipment for which a local stack of orders is defined (in other words, it might be a "local production cycle"), wherein the product produced by the production equipment is then part of a final product or further worked at another production equipment for obtaining a final product. The production cycle characterizing the final product might then be called "global production cycle" for differentiating the latter from the local production cycle involving production steps at one production equipment. The present invention might therefore cover global production cycles and/or local production cycles, managing in each case each involved buffer system.

Preferentially, the MES is configured for determining and possibly dynamically updating a priority of an order, e.g. of a local order, taking into account a planned and/or actual production progress for each product and/or a production step execution time as well as the times of occurrence and durations of the buffer reconfigurations determined by the SBMS. In particular, the MES is configured for estimating an arrival time of a product and/or order at production equipment. In this way, the SBMS may receive an updated stack of orders or a new order, wherein the priority of each order takes into account the production progress. According to another embodiment, the production is a clocked production wherein all products which are produced go through the same production equipment, and production steps for different products at a given production equipment take essentially the same time, determined by clocking.

Preferentially, the MES determines the local orders and communicates them to the SBMS. This includes time sequencing, which can be realized by the priority levels. The MES may or may not take into account the buffer reconfiguration times and the points in time when they occur, in this process, depending on whether the buffer reconfiguration times are negligible compared to typical production step execution times.

At step 202, the SBMS determines a configuration $C\_i+1$ of the buffer system and a production cycle $P\_i+1$ on the basis of an initial configuration $C'\_i+1$ and a stack of orders. The stack of orders contains all production orders which have not yet been completed when launching step 202. It contains for instance all uncompleted orders that remain after the execution of a previous production cycle. The stack of orders thus represents a current stack of orders when starting the determination of the configuration $C\_i+1$. The buffer system might be completely empty in the initial configuration $C'\_i+1$ or not. Even if not completely empty, the SBMS will first determine a truncated stack of orders by considering the buffer system as completely empty in the initial configuration $C'\_i+1$. In other words, remaining (physical) content within the initial configuration $C'\_i+1$ is first ignored for determining the truncated stack of orders, i.e. when determining the orders that will belong to the production cycle $P\_i+1$.

For the purpose of determining the configuration $C\_i+1$, the SBMS treats each order of the stack of orders, i.e. determines which content (notably in term of type and amount of material and/or tool) is required by each received order, going from the highest priority order to the lowest priority order, and allocates compartment or buffer system capacity to the required content until a predefined capacity of a compartment and/or of the buffer system is reached for the content. The predefined capacity is for instance a full capacity of the compartment or of the buffer system, wherein the capacity of a compartment, respectively of the buffer system, for a content is defined as the number or volume of the content (e.g. material or tool) that is contained within the compartment, respectively within the buffer system. In particular, the full capacity of a buffer compartment for a content is defined as the maximal number/volume of the content e.g. material or tool that might be contained in the compartment, and the full capacity of the buffer system for the content is defined as the sum of the full capacities of all compartments containing the content (in other words, it is the sum over all buffer system compartments configured for containing the content of the maximal number/volume of the content, e.g. material or tool, that might be contained in each of the compartments configured for comprising the content). In particular, the full capacity of a tool compartment is reached as soon as the compartment has been reserved by the SBMS for one tool.

When determining this configuration $C\_i+1$, the SBMS successively allocates compartment capacities for a certain number of orders figuring in the order stack. Due to the limited capacity of the buffer system, all orders of the order stack can usually not be satisfied, i.e. the SBMS cannot allocate compartment capacity for all orders within the order stack. There is indeed an upper (physical) limit for the availability of tools/materials defined by the capacity of the buffer system to stock materials and/or tools, which limits the number of orders that can be treated within a given production cycle, in particular the first one. The number of orders that can be treated within a production cycle thus depends on the capacity of the buffer system and is generally less than the number of known orders in the order stack.

Capacity allocation for a material or a tool used by production equipment for executing an order is thus realized by going top-down in an order of priority within the order stack, i.e. from the highest priority order to the lowest priority order. When considering the stack of orders, the SBMS is configured for determining, within the order stack, which order has the highest priority, and then allocates compartment capacity for satisfying the requirements of this highest priority order, and then proceeds to subsequent compartment capacity allocations by going through the order stack from the next highest priority order to the lowest priority order. In case the stack of orders is defined by the previously described list, the SBMS proceeds to allocations of capacities by iteratively treating the orders of the list, starting from the highest ranked order (i.e. the order with highest priority and/or earlier arrival) and treating then each lower ranked order until a limit of the buffer system or compartment capacity is reached. The production cycle, however, only includes orders for which the capacity requirements can be fully satisfied.

Therefore, as soon as all material and/or tool requirements for the order of highest priority are satisfied by the allocation of one or several compartment capacities (i.e. by the allocation of some buffer system capacity), then the SBMS allocates one or several compartment capacities for all material and/or tool of the next order which now has highest priority among the remaining orders of the stack of orders or of the list going therefore with the capacity allocations iteratively from the highest priority order to the lowest priority order.

For a material and/or tool required by any order treated by the SBMS, the latter automatically determines whether a compartment whose capacity has been allocated for the material already exists in the buffer system and/or whether a compartment capacity for a tool needed by the production equipment involved in the order has already been allocated for the production equipment or not. Regarding material, if such a compartment does not exist, then it allocates for the material capacity of a compartment for which there is no capacity allocation yet. If it exists, then the SBMS determines whether the compartment still has capacity for the material, and if yes, it further allocates compartment capacity for the material, until the amount of required material is reached or until a predefined capacity, e.g. the full capacity of the compartment is reached, and if the compartment has no further capacity for the material, for instance because the predefined capacity is reached, then it allocates, for the material, capacity of another compartment whose capacity has not yet been allocated.

The SBMS treats iteratively the orders of the stack of orders, e.g. of the list, allocating compartment capacity for content according to the requirement(s) of each treated order and determines the first order for which a requirement cannot be satisfied by allocating a compartment capacity, in particular because a remaining capacity of the smart buffer system is lower than the capacity that would be required by the order for a content. Indeed, due to the finite capacity of the buffer system, there generally exists an order for which the requirement for a tool or a material cannot be completely satisfied because there is no more compartment capacity available for enabling a compartment capacity allocation for the tool or material. For material, it occurs at the first order requiring a compartment capacity allocation for a material while the cumulative capacities which have been reserved for the material through the treatment of the orders already reached the full capacity or a predefined capacity of one or several compartments and that all other compartments are all already at least partially allocated for other materials and/or tools. For tools, it occurs at the first order which requires a new tool, while all tool compartments have already been allocated for other tools. Therefore, the SBMS determines which is the order for which for the first time a requirement for a tool or for a material cannot be satisfied. The last order of the stack of orders which has been completely satisfied (i.e. for which content requirements have been completely satisfied by allocating corresponding compartment capacities) is then called the "n_i+1_LS" order, and only all orders up to the n_i+1_LS order are included in the production cycle P_i+1 and form the so-called truncated order stack.

Nevertheless, allocation of capacity for materials preferentially continues beyond n_i+1_LS. The first material in the order immediately following n_i+1_LS for which demand cannot be fully satisfied receives the maximum possible allocation. This means that for all following materials, no more empty compartments can exist, but there could still be partially allocated compartments for other materials, so that the procedure can continue for these, again only satisfying demand to the degree which is still possible. In doing so, preferentially, the SBMS iteratively allocates compartment or buffer system capacity to orders not only according to order priority but also, within a given order, according to the material for which there is the highest demand within the treated order. For instance, for each order of the stack of orders or list that is treated by the SBMS, the SBMS starts to allocate compartment capacity for material for which there is the highest demand in the treated order and then continues top-down, i.e. from highest material demand to lowest material demand. The capacity planning carried out by the SBMS is in particular realized separately for each material type, taking into account that different material types can never co-use the same compartment, while more than one compartment might be used for the same material type. The SBMS continues with allocation until no further capacity allocation is possible (for instance, because for at least one material appearing in an order, there is no more available capacity that can be used for it (there may be compartments with partial allocations for other materials, and these cannot be used for the material in question even though they are not fully allocated), or because the capacity limit of each compartment is reached), or it can also be configured to break off earlier because planning for far away orders is rather uncertain due to incoming unplanned high priority orders. Should there still remain partially virtually filled compartments, depending on a configuration setting determined by the user, the SBMS may virtually fill them further depending on the statistical probability of receiving unplanned orders requiring these materials also.

The reason for further allocating compartment capacity after the determination of the truncated order stack (i.e. the reason for virtually filling a compartment with material that is required by an order that will not be completely satisfied) is twofold:

filling costs for a material may be reduced because the material volume independent term for accessing the compartment arises only once, for the orders of the current production cycle and orders of the next production cycle together. They will never be higher using this rule.

it advantageously opens the possibility to serve new incoming high priority orders during the execution of a current cycle (e.g. during the first cycle), while carrying only a minimal risk that the filled compartment will have to be emptied at the end of the current cycle (this could happen only if the orders for which the compartment was filled are later on pushed back in priority so far by new orders coming in during the execution of the production cycle that they do not appear at all in the next production cycle).

Preferentially, all buffer system capacity allocations for the remaining orders of the stack of orders, i.e. those which are not part of the truncated order stack, are memorized in the SBMS and used during the filling procedure.

Regarding tools, if a tool compartment capacity has already been allocated for a tool required by an order for production equipment, then the SBMS does not further allocate an additional compartment capacity for the tool, otherwise, it proceeds to the allocation of a compartment capacity for the tool. Preferentially, a current tooling state of the production equipment is taken into account by the SBMS when proceeding to capacity allocation for a tool, i.e. if a tool is already present on the production equipment, then no further allocation of a compartment capacity for the tool in the buffer system is necessary.

Advantageously, the previously described method steps ensure that the only partially allocated compartments are those virtually holding materials for which the requirements for all processed orders are satisfied completely, and it also ensures that each treated order is served according to its priority by allocating compartment capacities. Also, the advantage provided by starting, within any order, with the material for which there is the highest demand is that this will indirectly minimize the number of different materials in the buffer because the capacity is used up more quickly. As a consequence, the number of partially filled compartments in the buffer system will be smaller and buffer usage is optimized. The method according to the invention is thus particularly efficient in minimizing the number of partially filled compartments subject to the rule of treating orders according to priority, and then within any order, according to material demand, optimizing therefore buffer usage. It also favors the inclusion into the buffer system of materials for which there is a high demand.

The orders of the stack of orders up to the n_i+1_LS order included defines a set of production orders—the truncated order stack—for which it can be guaranteed that all required materials and tools can be provided by the buffer system without refill or exchange operations for materials and/or tools. The previously described allocation of compartment capacity for orders ranking after the n_i+1_LS order defines a set of orders that are not included in the truncated stack of orders and for which the requirements are only partially satisfied. Preferentially, if there are exceptionally only very few known orders in the stack of orders so that no truncation of the order stack is needed and the available full buffer system capacity for tools and/or materials is not completely used or cannot be completely reached, then the SBMS is configured for using statistics from past material consumption and/or tool usage in order to allocate the remaining buffer system capacity according to the statistics, automatically creating therefore potential future capacity allocations for not yet known incoming orders based on the statistics.

At step 203, the SBMS uses the capacity allocations made for the truncated order stack, i.e. up to the n_i+1_LS order, and preferentially for the set of orders for which the requirements are only partially satisfied, as a basis for reserving contents/assigning capacity of compartments of the buffer system according to the contents required by the considered orders, determining therefore the configuration C_i+1 of the buffer system for the production cycle P_i+1, and, if required, i.e. if the buffer system was initially not empty, further recording filling and/or emptying actions of compartments, so that the buffer system contents enable the execution of the production cycle P_i+1 by production equipment. By compartment assignment it has to be understood that a specific compartment or the capacity of a specific compartment (i.e. of a real compartment) within the buffer system is assigned to an order, while capacity allocation does not associate any concrete compartment to an order, and is only used for the calculation of the truncated order stack.

Preferentially, if the buffer system is completely empty in its initial configuration, then the SBMS assigns the compartment for which capacity has been allocated simultaneously with the allocation of the compartment capacity, i.e. step 203 and step 202 take place at the same time. Otherwise, if the buffer system was not completely empty in the initial configuration C'_i+1, then the SBMS determines first the truncated stack of orders by allocating compartment capacities to each order until the n_i+1_LS order, and preferentially for the set of orders for which the requirements are only partially satisfied, and then determines which configuration of the buffer system minimizes content (re)filling/emptying actions with respect to content requirement and assigns the compartments accordingly.

In order to minimize the content (re)filling/emptying actions, the SBMS is configured for matching the capacity allocations made for the production cycle P_i+1 against a current content of the buffer system, i.e. against the contents of the buffer system as defined by its configuration C'_i+1. As previously explained, the configuration C'_i+1 might correspond to a buffer system that is completely empty, or to a buffer system containing remaining materials and/or tools resulting from the execution of a previous production cycle. Therefore, in the configuration C'_i+1, the buffer system may contain either only free material compartments (i.e. that are completely empty), or at least one material compartment which is not empty. In the latter case, there can be, for each material, some number of physically filled compartments (zero included), but at most one partially filled compartment, because a compartment will always be fully used before another one is opened.

The SBMS treats each order of the stack of orders according to priority, from highest priority order to lowest priority order, and for each order preferentially treats its material demand from the highest demand to the lowest demand. For each treated order, the SBMS starts therefore with the material for which there is the highest demand for making compartment assignments. There are three types of actions the SBMS takes at this stage.

The reservation of material already physically present in a certain compartment (leftover from previous production cycle) for orders of the next production cycle;

The assignment of physically unoccupied and yet unassigned capacity of a certain compartment to material demand of orders of the next production cycle; and The marking of a certain compartment for emptying, so that its capacity becomes available and the action of type 2) can be applied subsequently (marking does not include the physical execution of emptying, one is still considering here the planning of all emptying and refilling actions; but a compartment marked for emptying is treated at this stage exactly like an empty compartment with no assignment). This may become necessary if there is no other way to satisfy the material demand for an order, but emptying can only occur for materials that are not needed for any order of higher priority than the one currently considered.

The assignment and reservation procedure is now described as an iterative procedure, at the first level iterating in orders and at the second level according to the size of the material demand. The general starting situation for a step in the iteration over materials within one order is the following:

For each material, there are no or some physically completely filled compartments that are still totally unreserved and unassigned to any order.

There is at most one physically completely filled compartment with a partial reservation (i.e. part of its material has been reserved for one or several orders).

There is at most one physically partially filled compartment, for which there can exist either no reservation, a partial reservation or a complete reservation of its contents to orders, and in addition either no, a partial or a full assignment of the remaining capacity to orders requiring the same material.

In addition, there will be empty compartments, for which none or some or all of their capacity has been assigned to orders of the next production cycle.

According to the remarks above, compartments marked for emptying with their capacity assigned partially or fully to another material are considered at the present stage as empty containers with a partial or full assignment of their capacity.

For example, at the very beginning of the iterative procedure there will only be completely unassigned compartments (i.e. whose whole capacity is unassigned) and no reservations of materials, and the compartments can be physically completely or partially filled or empty.

Figure 3:
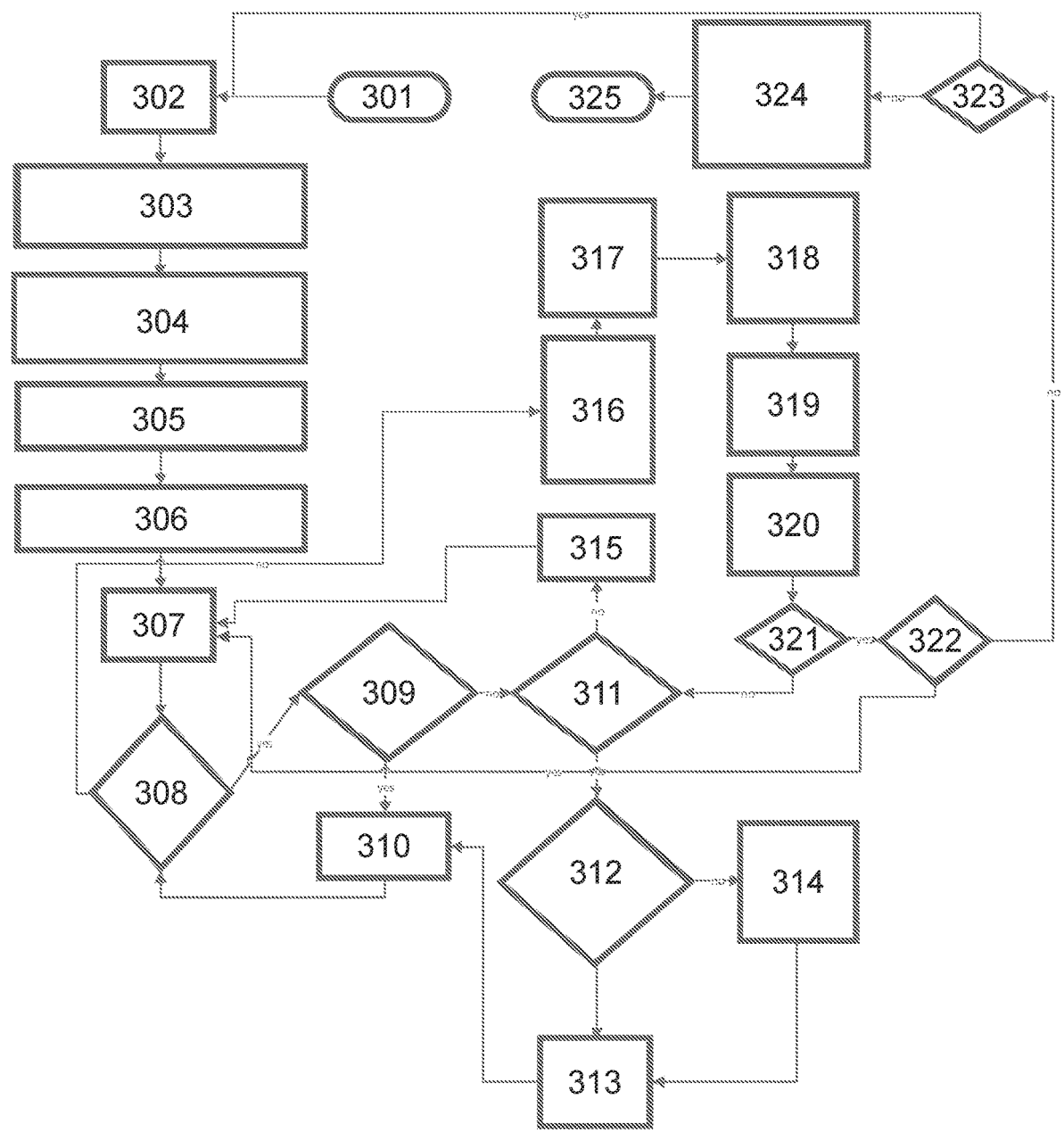
FIG. 3 is an illustration showing a preferred iterative procedure for assigning compartment and reserving material according to the invention.

A preferred example of the iterative procedure carried out by the SBMS is shown in FIG. 3 and explained below. To simplify the explanations, the case wherein the predefined capacity is the full capacity of the compartment is taken. Of course, the skilled person may consider the case wherein the predefined capacity is different from the full capacity.

At step 301, the SBMS starts the iterative assignment and reservation procedure.

At step 302, the SBMS considers the next order according to priority and proceeds to the following steps for the considered order.

At step 303, for all materials with a demand superior or equal to the full capacity of one compartment, the SBMS fully reserves contents (i.e. material) for all physically full compartments with that material that have no reservation, in so far as (fully) needed and possible, each of the physically full compartments being then excluded from further consideration (i.e. from further capacity assignment and/or material reservation of the iterative procedure).

At step 304, for all materials with a remaining demand superior or equal to the full capacity of one compartment, the SBMS reserves a physically full compartment with that material that is partially reserved, if one exists (the compartment contents is therefore fully reserved; fully reserving the compartment means reserving the material that physically fills the compartment until the whole material is reserved and thus the full capacity reached).

At step 305, for all materials with a remaining demand superior or equal to the full capacity of one compartment, the SBMS reserves/assigns capacity of a physically partially filled compartment with that material, if one exists, to the maximum possible extent (i.e. until the full capacity has been assigned).

At step 306, for all materials with remaining demand superior or equal to the full capacity of one compartment, the SBMS assigns remaining capacity of a physically empty compartment which has a partial assignment for that material, if one exists.

Afterwards, at step 307, the SBMS considers the material with highest remaining demand within the order and determines, at step 308, whether the remaining material demand of the considered material equals or exceeds the full capacity of one compartment.

At step 309, if the remaining material demand equals or exceeds the full capacity of one compartment, then the SBMS determines whether a physically empty compartment exists with no assignment.

And if it exists, then the SMBS assigns capacity of the compartment as far as necessary at step 310 and continues with step 308; if it does not exist, then the SBMS proceeds to step 311, wherein it determines whether the considered order is part of the truncated stack of orders.

If the considered order is part of the truncated stack of orders, then the SBMS determines at step 312 whether a partially physically filled compartment exists with material not needed by this or higher priority orders. If it exists, then the SBMS continues with step 313 wherein it marks the partially physically filled compartment for emptying and continues with step 310. If it does not exist, then the SBMS chooses at step 314 a physically full compartment with material not needed by this or higher priority orders (there must exist one) and continues with step 313.

If there is a choice for the partially physically filled or physically full compartment in step 313, the SBMS preferentially computes a cost for emptying a compartment that is a function of the material (e.g. in function of the type of material that has to be removed from the compartment) and its amount (i.e. which quantity of material has to be removed), in order to resolve this ambiguity and decide what is the best (i.e. lowest cost) choice. Optionally, the SBMS automatically computes an additional cost for emptying a compartment, wherein the additional cost is a function of the priority of the order whose required material is going to be removed from the compartment. The higher the priority, the higher the additional cost. The justification for this is that higher priority orders will be treated first and therefore the negative effect of taking out already reserved materials will be felt earlier. The additional cost is in other words a cost penalty, since the content which is going to be removed from a compartment for satisfying a new order was reserved for an order which was already planned. If a compartment capacity assignment was created by the SBMS on the basis of a statistical probability of receiving an unplanned order, then there is either no additional penalty or a smaller penalty compared to removing material required by a received order.

At step 311, if the considered order is not part of the truncated stack of order (i.e. is an order with a priority lower than the last order of the stack of orders which has been completely satisfied by allocating compartment capacity), then the SBMS proceeds to step 315 wherein it stops considering this material for this order and continues with step 307.

Therefore, the procedure described in FIG. 3 proposes preferably to not use an emptying action for an order that is not included in the truncated order stack for the currently planned production cycle. The reason is that emptying compartments is generally relatively expensive, in particular when taking into account that the material has to be transported back to the warehouse. After execution of the current production cycle, most of the compartment capacity will have been vacated, very likely making it superfluous to use expensive emptying actions. Also, the situation may change during the execution of the currently planned production cycle, because new orders may come in that repress existing orders due to their higher priority, possibly rendering useless emptying actions taken for these repressed orders.

At step 308, if the remaining material demand of the considered material (i.e. the material with highest remaining demand—see step 307) is not equal or does not exceed the full capacity of one compartment, then the SBMS proceeds successively to the following steps.

At step 316, it uses up unreserved material of a physically full but only partially reserved compartment in so far as necessary, if any such compartment exists.

Then, if necessary, it performs step 317, wherein it satisfies remaining demand with a physically full but completely unreserved compartment, if any exists.

Then, if necessary, it performs step 318, wherein it satisfies remaining demand with a physically partially filled compartment in so far as possible (proceeding to reservation and capacity assignment), if any exists.

Then, if necessary, it performs step 319, wherein it satisfies remaining demand with a physically empty, but partially assigned compartment, if any exists.

Then, if still necessary, performs step 320, wherein if satisfies remaining demand with a physically empty, but completely unassigned compartment, if any exists.

It has to be noted that in the above-mentioned case wherein the remaining material demand is less than the full capacity of one compartment, the partial assignment of the capacity of a physically empty compartment occurs for the first time when any physically partly filled compartment (if existing) has been fully assigned/reserved. So, after this has happened, any possibly existing physically partly filled compartment with this material has effectively disappeared from the consideration, for this and any following orders.

After step 320, the SBMS proceeds to step 321, wherein it determines whether the material demand is satisfied or not. If the material demand is not yet satisfied, then it continues with step 311. If the material demand is satisfied, then the SBMS determines at step 322 whether there is any more material demand for this order. If yes, then it continues with step 307. If no, then the SBMS proceeds to step 323 wherein it determines whether there is any further untreated order.

If yes, it continues with step 302.

If no, then it optionally proceeds to step 324, called "final consolidation step", wherein if there exists an unreserved physically partially filled compartment and a physically full partially reserved compartment for the same material, then the SBMS shifts reservation of material in the full compartment to the partially filled compartment as far as possible, and then, the SBMS ends the iterative assignment and reservation procedure at step 325.

In the steps 316-320 describing the iterative process for the case wherein a remaining demand is less than the full capacity of one compartment, the usage of a partially physically filled compartment can occur only after any possibly existing physically full compartments, with or without reservation, have been fully exploited. This guarantees minimization of emptying costs in case later orders require emptying compartments holding this material in order to satisfy the demand for other materials. On the other hand, the final consolidation step (see step 324 described above) is configured in case no such emptying action has occurred after having treated all known orders. It avoids the disadvantageous occurrence of multiple physically partially filled compartments. By more detailed considerations of all possible scenarios, it can be shown that this is the most cost efficient strategy except in rare cases, where the optimum cost is missed by a small amount.

The previously described method for filling/refilling/emptying material in compartments of the buffer system advantageously enables to minimize handling costs, in particular filling and emptying costs, and transport costs as much as possible, minimizing therefore the costs for managing the buffer system. According to the present invention, buffer management costs are optimized subject to the constraint that orders must be served according to their priority.

The previously described steps enable the SBMS to determine the filling and/or refilling and/or emptying actions of the buffer system with respect to material in order to minimize the costs, and therefore to determine the best configuration $C\_i+1$ of the buffer system with respect to the material requirements. Similarly, the SBMS also automatically determines the actions which will have to be carried out with respect to tools in order to enable the execution of the production cycle $P\_i+1$. The procedure for tools is essentially a simplified version of the procedure for materials. For tools, the SBMS proceeds order by order according to order priority and determines whether a tool required for the execution of a production order by a production equipment is already physically present in a compartment of the buffer system or not. If not, then the SBMS automatically assigns the capacity of a tool compartment for the tool and records a filling action for the concerned compartment; if yes, no further action is required, and the SBMS proceeds to the next tool requirement.

At some point, the buffer system may have all its tool compartments fully assigned, preventing therefore any further assignment and/or filling actions for the treated order requiring a new tool unless a tool already physically present within the buffer system or hold by a production equipment is removed. In that case, the SBMS is configured for recording an emptying action, if it is possible to make a further assignment by removing a tool needed only for orders of lower priority than the one currently treated. The SBMS is configured for always removing the tool corresponding to the order of lowest priority. This procedure for removing tools continues until the SBMS is unable to satisfy a tool requirement of a currently processed order, because for instance all tool compartments are already reserved for tools required by orders of a higher priority than the currently processed order. In that case, the SBMS stops assigning compartments for tools.

At step 204, the SBMS automatically provides instructions to a transport system and/or operator, wherein the instructions are configured for controlling content filling/emptying actions with respect to compartment capacities that have been assigned to the treated orders. In particular, the SMBS is configured for automatically directing a transport system and/or operators for physically filling and/or emptying the compartments of the buffer system according to the compartment assignments made for the production cycle $P\_i+1$. For instance, the SBMS automatically creates, for each compartment of the buffer system, an instruction regarding the amount of material or the tool that has to be placed in each of the compartment, the instruction being preferentially sent to the transport system for being automatically executed by the latter or by an operator. Once a compartment is filled with material or a tool as required by one or several orders, then the physical material or tool is reserved for the orders, i.e. for a production step at production equipment corresponding to the orders.

At step 205, after the filling/emptying of each compartment with materials or a tool as defined by the provided instructions in order to achieve the configuration $C\_i+1$ determined by the SBMS, the latter triggers, preferentially automatically, a start of the first production cycle $P\_i+1$, wherein production equipment uses the materials and/or tools of the buffer system for producing the products required by the orders of the truncated order stack. The SBMS uses the materials in the buffer system according to the reservations made in step 203 and 204.

Preferentially, new production orders received by the SBMS during the execution of the production cycle $P\_i+1$ are processed by the SBMS as follows:

a) a new production order that has a priority lower than the priorities of the orders in the truncated order stack is stored in a memory and added to the remaining order stack (i.e. added to the set of the previously received orders which starts from the order next to the last order of the current truncated order stack and are not part of the current truncated order stack). Any allocation of compartment capacity for the new production order therefore has to be postponed until the end of the current production cycle and the determination of the configuration of the buffer system for the next production cycle.

b) a new production order that has a higher priority compared to the priority of an existing order K in the current truncated order stack is processed by the SBMS, wherein the SBMS triggers an execution of the new production order before the execution of the existing order K (i.e. it triggers the production of the product required by the new production order before producing the product required by the existing order K), provided that each new production order requirement can be fully satisfied with the current configuration of the buffer system, i.e. the current amount(s) of material(s) and the current tool(s) stored in the buffer system; otherwise, the processing of the new production order is postponed until the end of the execution of the current production cycle and the determination of the configuration of the buffer system for the next production cycle. Orders that are currently executed at any production equipment are protected, i.e. their material reservations are not changed. By consequence, reservations for not yet executed orders that have a lower priority compared to the new production order are changed in order to first satisfy any newly incoming order with a higher priority. Any removal of a reservation of material and/or tool for an order contained within the truncated order stack withdraws the order from the truncated order stack and puts it in the set of remaining orders. Therefore, in the case where a new incoming production order has a higher priority compared to the order K of the truncated order stack and requires an amount Q of material A, the SBMS is in particular configured for removing the reservation for the material A of the order of lowest priority that required the material A (and if there is a choice between several orders of the same lowest priority, then it chooses the order that came in latest) and then goes up (i.e. processes orders from lowest priority to highest priority) in the truncated order stack for removing the reservation for the material A of each subsequent order until the amount Q is reached or the order K is reached. If the amount Q is not reached when arriving at the order K, then the processing of the new incoming production order is postponed until the end of the execution of the current production cycle and the determination of the configuration of the buffer system for the next production cycle. Optionally, other rules might be applied by the SBMS for managing new incoming production orders with priority higher than an order of the truncated order stack, for instance choosing among the lower priority orders the one whose reservations match best the material demand of the new incoming production order, and continuing the same way after that first match to satisfy the remaining demand.

At step 206, the SBMS records the usage of material of the buffer system by the production equipment during the execution of the production cycle $P\_i+1$, so that the buffer system content is known at the end of the production cycle $P\_i+1$, the configuration of the buffer system at the end of the production cycle $P\_i+1$ defining therefore a new initial configuration $C'\_i+2$ for a next production cycle. The data corresponding to the usage of material (material type, amount and compartment) are preferentially updated in real time during production cycles so that the SBMS is aware of the contents of the buffer system not only at the end, but at any moment during each production cycle.

At step 207, the SBMS automatically updates the stack of orders after the end of the execution of the production cycle $P\_i+1$. Preferably, the SBMS may communicate to the MES or production management system a list of executed orders. Preferentially, after the end of the execution of each production cycle and/or before starting a production cycle, any remaining content reservations and/or compartment assignments are cancelled by the SBMS. If needed, the SBMS may automatically start a new production cycle, returning therefore to step 202 and then repeating steps 203-207, using, as initial configuration of the buffer system, the new initial configuration $C'\_i+2$ obtained at the end of the execution of the production cycle $P\_i+1$ and the updated stack of orders. According to the present invention, the method steps repeats cyclically (see FIG. 2) in order to determine before starting each new production cycle the best configuration of the buffer system.

Preferentially, the SBMS contains a time limit (for instance in terms of days, like 10 days) that prevents the SBMS to treat an order requiring a compartment capacity assignment for a content required for a manufacturing operation planned for a date falling after the time limit when counted from the date at which the order was received by the SBMS. Advantageously, this avoids long term planning, which may contain high uncertainties due to incoming unplanned higher priority orders.

Preferentially, the MES according to the invention is in particular in charge of the autonomous organization of the transport of content for filling or emptying the buffer compartments. The MES system 12 may further have the following functions in order to improve quality and process performance of manufacturing plants: resource allocation and status, dispatching production orders, data collection/acquisition, quality management, maintenance management, performance analysis, operations/detail scheduling, document control, labor management, process management and product tracking. In particular, the MES system and the SBMS cooperate for planning the transport of each content, for e.g. for materials and/or tools that have to be delivered to compartments of the smart buffer.

In particular, the following information might be provided by the SBMS for the organization of the transport of material and/or tools by the MES:
a) an amount or number or volume of materials/tools, for instance defined for each type of material and/or tool; and/or
b) a warehouse of origin; and/or
c) a destination within the buffer system and/or a compartment location wherein the amount/number/volume of materials and/or tools has to be dropped off.

Preferentially, a transport management system, which can be included in the MES or a separate entity, is then configured for managing the execution of the transport of each content, e.g. by choosing appropriate means of transport, and/or combining different materials/tools that come from a same warehouse, etc. For this purpose, it might use the information provided by the SBMS for the organization of the transport. Preferably, the MES system tracks the completion of each transport orders and commands and/or controls a physical filling or emptying action of the compartments of each buffer according to the configuration of each buffer system determined by the SBMS.

Finally, the present invention has several advantages compared to existing techniques:

a) the SBMS enables a reduction of effort for buffer replenishment operations, both with respect to necessary material or tool transports to the smart buffer and the filling/emptying operations on the smart buffer itself, and consequently a reduction of costs for buffer management;

b) it offers a safeguard against occurrence of shortage of materials during production;

c) it enables to reduce human planning and surveillance efforts;

d) it is able to automatically determine the configuration of the buffer system that will minimize the costs by automatically taking into account different parameters such as: order priorities, possibly refined by time of arrival cost parameters for material transport, filling and emptying, the latter possibly being dependent on material type and amount;

e) cost parameters for tool exchange actions that will have to be carried out (transport and tool handling);

f) the SBMS according to the invention is able to assign compartment capacity, notably of a compartment which is partially assigned and/or filled with a material, based on a statistical probability of receiving an unplanned order requiring the material, being therefore able to treat forecasted buffer content requirements; and g) all method steps are preferentially automated.

The invention claimed is:

1. A method for managing a buffer system, the buffer system having compartments for stocking contents needed for a production of at least one product by a production equipment during an execution of a production cycle, wherein the production cycle is defined by a stack of orders whose execution by the production equipment results in the production of the at least one product, the method comprises the following steps of:
a) determining, by means of a smart buffer management system (SBMS), from an initial configuration $C'\_i+1$ of the buffer system and the stack of orders, a production cycle $P\_i+1$ and a configuration $C'\_i+1$ of the buffer system enabling an execution of the production cycle $P\_i+1$, wherein the determination is obtained by the SBMS by a digital twin carrying out a virtual filling of the compartments of the buffer system with content required by orders of the stack of orders;
b) providing instructions controlling content filling/emptying actions to a transport system and/or operator for filling and/or emptying the compartments of the buffer system in order to achieve the configuration $C\_i+1$ for the buffer system;

c) triggering an execution of the production cycle P_i+1 by the production equipment while recording usage of a buffer system content; and d) updating the stack of orders after an end of the execution of the production cycle P_i+1 by removing from the stack of orders all the orders which have been fully executed during the execution of the production cycle P_i+1 and, if needed, automatically starting a new production cycle by repeating steps a)-d), using, as the initial configuration of the buffer system, a configuration at the end of the execution of the production cycle P_i+1 and an updated stack of orders.

2. The method according to claim 1, wherein the SBMS is configured for computing a cost for emptying a compartment that is a function of its content and determining which configuration minimizes compartment emptying costs.

3. The method according to claim 1, wherein, in step a), the orders of the stack of orders are treated by the SBMS from a highest priority order to a lowest priority order when allocating or assigning compartment capacities for the content required by a treated order.

4. The method according to claim 3, wherein if two said orders have a same priority within the stack of orders, then an order received first by the SBMS is treated first by the SBMS.

5. The method according to claim 3, wherein the determination within the step a) comprises:
performing a first step, wherein the buffer system is considered as empty for determining the production cycle P_i+1 even if the buffer system contains the content according to the initial configuration C'_i+1, wherein the SBMS iteratively allocates capacities of the compartments of the buffer system to the content required by the orders of the stack of orders by treating each order until a capacity limit of the buffer system and/or of the compartment is reached, but without yet assigning the compartment itself for the content for which a capacity has been allocated, wherein all the orders completely satisfied by capacity allocation form a set of orders called "truncated stack of orders", wherein a last order of the truncated stack of orders which has been completely satisfied by allocating compartment capacity of the buffer system is called an n_i+1_LS order, the SBMS including then all the orders of the truncated stack of orders and only the latter in the production cycle P_i+1; and
performing a second step, wherein the SBMS automatically determines, from the initial configuration C'_i+1 of the buffer system, the configuration C_i+1 which minimizes costs for the content filling/emptying actions with respect to the content requirements defined by the production cycle P_i+1, and wherein the SBMS assigns (203) compartments for the contents for which a capacity has been allocated.

6. The method according to claim 5, wherein the SBMS is configured for matching capacity allocations made for the production cycle P_i+1 against the contents of the buffer system as defined by the initial configuration C'_i+1 for minimizing costs for the content filling/emptying actions.

7. The method according to claim 5, wherein the content required by orders contains a tool and wherein the SBMS takes into account a tooling state when proceeding to capacity allocation for the tool.

8. The method according to claim 5, wherein the SBMS is configured for performing at least one of the following actions:

a reservation of the content already physically present in the compartment;

an assignment of physically unoccupied and yet unassigned capacity of the compartment; and a marking of the compartment for emptying, so that its capacity becomes available and an assignment action is possible.

9. The method according to claim 5, wherein the content required by the orders contains material and within each treated order, the SBMS iteratively allocates the capacity according to the material for which there is a highest demand within a treated order, going then top-down from a highest material demand to a lowest material demand.

10. The method according to claim 9, wherein the SBMS is configured for further allocating capacity for materials for the orders beyond the n_i+1_LS order.

11. The method according to claim 9, wherein the second step further comprises the following sub-steps:

step 301) starting an iterative assignment and reservation procedure;

step 302) considering a next order according to priority, and for all materials with a demand superior or equal to a full capacity of one compartment, perform successively the following steps:

step 303) fully reserving contents for all physically full compartments with the material that have no reservation, in so far as needed and possible;

step 304) reserving a physically full compartment with the material that is partially reserved, if one exists;

step 305) assigning capacity of physically partially filled compartment with the material, if one exists, to a maximum possible extent;

step 306) assigning remaining capacity of physically empty compartment which has a partial assignment for the material, if one exists;

step 307) considering the material with highest remaining demand within the order;

step 308) determining whether a remaining material demand of considered material equals or exceeds a full capacity of one compartment; and if yes, then proceed to step 309) determining whether physically empty compartment exists with no assignment;

if it exists, then proceed to step 310) assigning capacity of the compartment as far as necessary and going back to step 308), otherwise:

if it does not exist, then proceed to step 311) determining whether a considered order is part of the truncated stack of orders;

if yes, then proceed step 312) determining whether partially physically filled compartment exists with material not needed by this or higher priority orders;

if it exists, then proceed to step 313) marking the partially physically filled compartment for emptying, and going back to step 310);

if it does not exist, then proceed to step 314) choosing a physically full compartment with material not needed by this or higher priority orders and continuing with step 313);

if no, then proceeds to step 315) stopping considering this material for this order and continuing with step 307);

if no, then proceeds successively to the following steps:

step 316) using up unreserved material of physically full but only partially reserved compartment in so far as necessary, if any such compartment exists;

step 317) if necessary, satisfying remaining demand with physically full but completely unreserved compartment, if any exists;

step 318) if necessary, satisfying remaining demand with physically partially filled compartment in so far as possible, if any exists;

step 319) if necessary, satisfying the remaining demand with physically empty, but partially assigned compartment, if any exists; and step 320) if still necessary, satisfying the remaining demand with physically empty, but completely unassigned compartment, if any exists;

step 321) determining whether the material demand is satisfied or not;
if not satisfied, then continuing with step 311);
if satisfied, then proceed to step 322) determining whether there is any more material demand for this order;
if yes, continuing with step 307);
if no, then proceed to step 323) determining whether there is any further untreated order;
if yes, continuing with step 302);
if no, proceed to step 325) ending the iterative assignment and reservation procedure.

12. The method according to claim 11, which further comprises performing step 324) between the step 323) and the step 325), the step 324) comprising determining if there exist unreserved physically partially filled compartment and physically full partially reserved compartment for same material, and if yes, shifting reservation of the material in a full compartment to partially filled compartment as far as possible.

13. The method according to claim 1, wherein the stack of orders comprises any production order received by the SBMS and not yet completed, and if any, production orders received during an execution of a previous production cycle and which have not been completed during the previous execution cycle and/or orders of the previous production cycle which were not completed during the previous production cycle.

14. A smart buffer management system for managing a buffer system, the smart buffer management system comprising:
a processer;
a memory;
a connection to a network;
the smart buffer management system configured to perform the steps of claim 1.

15. A buffer system, comprising:
compartments for stocking contents needed for a production of at least one product by a production equipment during an execution of a production cycle; and a smart buffer management system according to claim 14.

* * * * *